United States Patent
Tehrani

(10) Patent No.: US 7,148,493 B2
(45) Date of Patent: Dec. 12, 2006

(54) METHOD, APPARATUS, AND SYSTEM FOR IMAGING A FLUORESCENT OBJECT

(75) Inventor: Justin A. Tehrani, Broomfield, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 614 days.

(21) Appl. No.: 10/352,299

(22) Filed: Jan. 27, 2003

(65) Prior Publication Data
US 2004/0144930 A1    Jul. 29, 2004

(51) Int. Cl.
*H04N 7/16* (2006.01)
(52) U.S. Cl. .................................. 250/461.1
(58) Field of Classification Search ............. 250/461.1, 250/462.1, 458.1, 459.1, 201.2, 201.3, 201.4; 235/454, 468, 472
See application file for complete search history.

(56) References Cited

U.S. PATENT DOCUMENTS

| | | | |
|---|---|---|---|
| 3,818,190 A * | 6/1974 | Silverman et al. ........... 235/382 |
| 3,947,661 A * | 3/1976 | Silverman et al. ........... 235/382 |
| 5,548,106 A * | 8/1996 | Liang et al. ................. 235/454 |
| 5,557,416 A * | 9/1996 | Sasanuma et al. ........... 358/300 |
| 5,696,594 A * | 12/1997 | Saito et al. .................. 358/296 |
| 5,719,681 A * | 2/1998 | Sasanuma et al. ........... 358/296 |
| 5,834,758 A * | 11/1998 | Trulson et al. ............. 250/201.2 |
| 5,959,296 A | 9/1999 | Cyr et al. |
| 6,064,062 A * | 5/2000 | Bohn ....................... 250/237 R |
| 6,072,171 A * | 6/2000 | Nakamura et al. ........... 250/216 |
| 6,165,592 A * | 12/2000 | Berger et al. ............. 428/195.1 |
| 6,198,835 B1* | 3/2001 | Banton et al. ............... 382/112 |
| 6,337,472 B1* | 1/2002 | Garner et al. ............. 250/201.3 |
| 6,616,043 B1* | 9/2003 | Zazzu et al. ............. 235/462.01 |
| 6,758,398 B1* | 7/2004 | Philyaw et al. .............. 235/454 |

\* cited by examiner

*Primary Examiner*—Otilia Gabor

(57) ABSTRACT

A method of imaging an object comprising emitting ultraviolet light having a single intensity on the object, converting light fluoresced by the object into electrical charges comprising a scanned image of the object, and generating a data set defining the scanned image is provided. An apparatus for imaging a document surface comprising a first illumination device operable to emit ultraviolet light of a single intensity onto the document surface, and a photosensitive device operable to receive fluoresced light emitted by the document surface and convert the received light into electrical signals comprising a scanned image of the document surface is provided.

5 Claims, 2 Drawing Sheets

METHOD, APPARATUS, AND SYSTEM FOR IMAGING A FLUORESCENT OBJECT

TECHNICAL FIELD OF THE INVENTION

This invention relates to imaging technologies and, more particularly, to a method, apparatus, and system for imaging a fluorescent object.

BACKGROUND OF THE INVENTION

Document scanners convert a visible image on a document, photograph, a transparent media and the like into an electronic form suitable for copying, storing and processing by a computer. A document scanner may be a stand-alone device or integrated with a copier, a facsimile machine, a multipurpose device, etc.

Scanners have a transparent plate or platen against which an object to be scanned is placed. The document is scanned by sequentially imaging narrow strips, or scan line portions, of the document on a linear optical sensor array such as a charge-coupled device (CCD). The optical sensor array produces electronic data which is representative of each scan line portion of the document which is imaged thereon.

In one type of scanner, the platen and document remain stationary and at least a portion of an imaging assembly is moved to change the scan line portion which is currently imaged. Many scanners comprise a fluorescent lamp typically implemented as a tube having a phosphor coating around the inside surface thereof. Fluorescent lamps generate light by passing electricity through the lamp tube. The lamp tube holds an inert gas and typically a quantity of mercury. The electricity passing through the lamp tube energizes mercury atoms and energy in the form of light photons is emitted therefrom. The light emitted from the tube comprises a majority of ultraviolet (UV) photons with a small amount of visible light photons. Phosphors, or another fluorescent substance, is coated around the inner surface of the lamp tube and converts the invisible UV light into visible light.

Fluorescent materials that absorb light of one wavelength, e.g., invisible UV light, and that re-radiate light at another wavelength, e.g., a visible light wavelength, are said to fluoresce and appear to glow when exposed to black light in the absence of irradiation of light in the visible light spectrum. Fluorescent colored inks, dyes, and paints are used to create various "glow-in-the-dark" products that fluoresce when irradiated with UV light. For example, images may be printed on a document with fluorescent ink that are invisible when illuminated with visible light but that visibly fluoresce when irradiated with a black light.

SUMMARY OF THE INVENTION

Heretofore, a scanner operable to irradiate and electrically image a fluorescent image printed on a document has not been provided.

In accordance with an embodiment of the present invention, a method of imaging an object comprising emitting ultraviolet light having a single intensity on the object, converting light fluoresced by the object into electrical charges comprising a scanned image of the object, and generating a data set defining the scanned image is provided.

In accordance with another embodiment of the present invention, an apparatus for imaging a document surface comprising a first illumination device operable to emit ultraviolet light of a single intensity onto the document surface, and a photosensitive device operable to receive fluoresced light emitted by the document surface and convert the received light into electrical signals comprising a scanned image of the document surface is provided.

In accordance with yet another embodiment of the present invention, a system for imaging an object comprising means for emitting ultraviolet light of a single intensity on the object, means for receiving visible light fluoresced from the object, means for converting the fluoresced light into electric signals comprising a scanned image of the object, and means for generating a data set defining the scanned image is provided.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

The preferred embodiment of the present invention and its advantages are best understood by referring to FIGS. 1 through 4 of the drawings, like numerals being used for like and corresponding parts of the various drawings.

Figure 1:
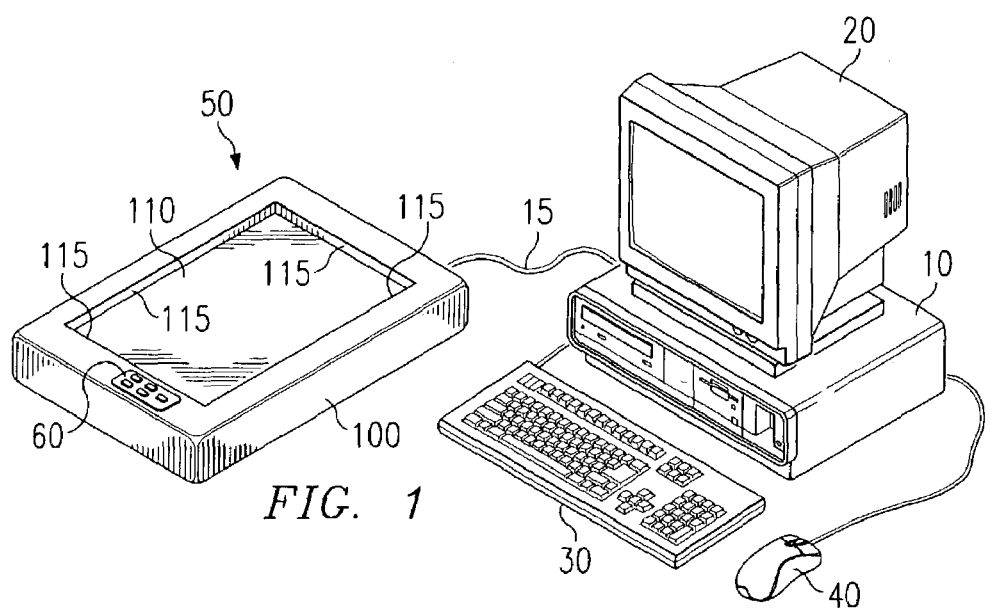
FIG. 1 is a perspective view of a document scanner apparatus connected to a computer in which an embodiment of the present invention may be implemented for advantage.

FIG. 1 is a perspective view of a document scanner apparatus 50 connected to a computer 10 in which an embodiment of the present invention may be implemented for advantage. Document scanner apparatus 50 comprises a transparent platen 110 against which the document to be scanned is placed. Apparatus 50 is generally operable to convert an image of a media object into an electronic form suitable for copying, storing and processing by a computer 10. Apparatus 50 may be interconnected with computer 10, or another suitable computational device, via any one of various external peripheral interfaces, such as an electrical cable 15 and a serial port interconnection, parallel port interconnection, a universal serial bus interconnection, or another suitable interface. An image scanned by apparatus 50 may be displayed on a display device 20, such as a cathode ray tube (CRT) display, connected to computer 10. Computer 10 may have various peripheral devices, such as a keyboard 30, a mouse 40, and/or another input device, for receiving user input thereto and respectively connected therewith via an input/output interface. User input provided to computer 10 may be provided to facilitate operation of apparatus 50. Apparatus 50 may have an input panel 60 that comprises one or more keys used for inputting commands from the user thereof and for directing operation of apparatus 50. Additionally, apparatus 50 may comprise an output device, such as a liquid crystal display, for providing visual feedback regarding operational status, operational mode, or other information regarding operational condition(s) of apparatus 50.

Figure 2:
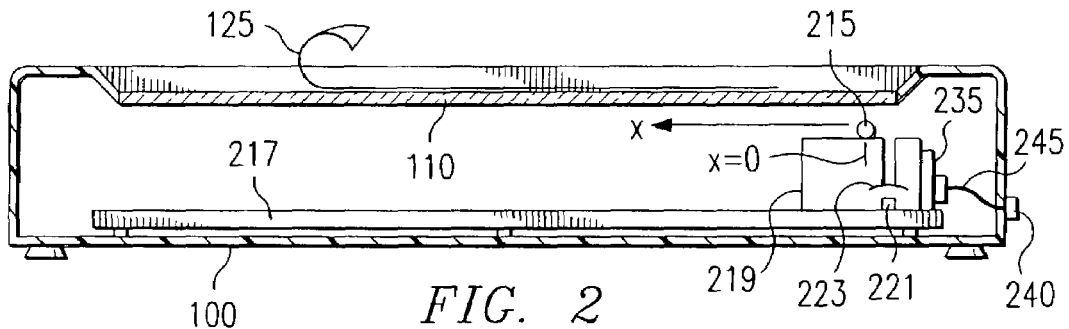
FIG. 2 is a cross-sectional side view of a document scanner apparatus shown in configuration for scanning an image on a media object and which may be modified for implementing an embodiment of the present invention.

FIG. 2 is a cross-sectional side view of scanner apparatus 50 shown in a configuration for scanning an image on a media object 125 and which may be modified for implementing an embodiment of the present invention. Apparatus 50 comprises an illumination device 215, such as a fluorescent lamp tube. Illumination device 215 may be attached to a carriage 219 operable to impart a linear motion of the lamp along a rail 217 or another guide structure. An optic system 223, such as a mirror and lens assemblage, may also be included on carriage 219 as well as a photosensitive device 221, such as an array of charge-coupled devices (CCDs). Media object 125 is placed against platen 110 of apparatus 50. As carriage 219 moves lamp 215 along the length, or a portion thereof, of rail 217, visible light from lamp 215 is directed onto media object 125 through platen 110 and reflected. The reflected light is collected by internal optic system 223 and directed onto photosensitive device 221 where the light is converted into one or more electric signals. Generally, carriage 219 has a home position (X=0) from which scan operations are initiated. As light is radiated from lamp 215, carriage 219 moves through a translation distance (X) along rail 217. Photosensitive device 221 converts light radiated from lamp 215 as carriage 219 moves through the translation distance into electric signals that may be processed by computer 10 and assembled into a graphic representation of the imaged media object.

Figure 3:
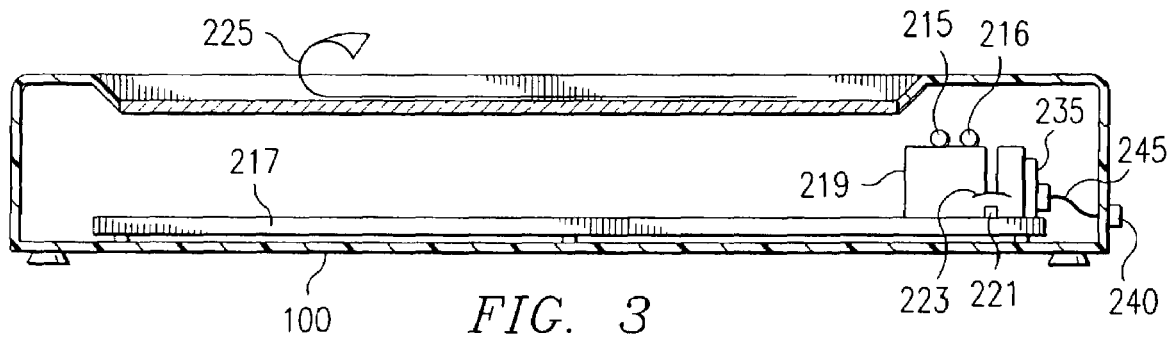
FIG. 3 is a cross-sectional side view of a document scanner apparatus shown in configuration for scanning a fluorescent image on a media object according to an modified for the present invention.

FIG. 3 is a cross-sectional side view of scanner apparatus 50 shown in a configuration for scanning a fluorescent image on a media object 225 according to an embodiment of the present invention. Apparatus 50 preferably comprises fluorescent illumination device 215 that emits visible light and a black light illumination device 216 attached to carriage 219 operable to impart a linear motion along rail 217 or another structure. Illumination devices 215 and 216 may be coupled with an input device, for example a key of input panel 60 (FIG. 1), preferably operable to switchably supply an electric source thereto. Optic system 223 may also be included on carriage 219 as well as photosensitive device 221. Apparatus 50 may comprise a scan controller 235 implemented as a printed circuit board for receiving and processing scan commands, directing operation of apparatus 50 components, and/or transmitting image data to an input/output interface 240. Black light illumination device 216 may be implemented according to any one of various black-lighting technologies. For example, black light illumination device 216 may be implemented as a fluorescent lamp with a phosphor coating that emits ultraviolet light, e.g. UV-A, and is preferably powered by an alternating current source and emits ultraviolet light of a substantially single uniform intensity therefrom. Blue and violet light wavelengths may also be radiated from black-light illumination device 216 for producing a glow from irradiated phosphors on the imaged media object. Media object 225 may have an image, text, or other elements printed thereon with fluorescent inks or dyes that radiate visible light when irradiated with UV light. As carriage 219 moves lamp 215 along the length of rail 217, UV light from lamp 216 is directed onto the fluorescent image on media object 225 through platen 110 and visible light is radiated therefrom. The visible light radiated from media object 225 is collected by optic system 223 and directed onto photosensitive device 221 where the light is converted into one or more electric signals. The particular arrangement of illumination devices 215 and 216 is exemplary only and the relative locations thereof in relation to photosensitive device 221 may be interchanged. That is, the positions of black light illumination device 216 and illumination device 215 on carriage 219 may be interchanged. Moreover, the number of illumination devices 215 may be modified without departing from the teachings of the invention. For example, multiple fluorescent devices 215 that emit visible light may be included on carriage 219 for improving the signal-to-noise ratio when performing reflective scans. In yet another configuration, carriage 219 may comprise a single illumination device interface. In such an embodiment, a fluorescent object is imaged by disposing a black light illumination device on carriage 219 in the absence of a visible light illumination device. A scanner apparatus featuring a carriage with a single illumination device interface can easily be configured to perform scans by visible light and black light by simply changing the illumination device according to the desired imaging task.

Figure 4:
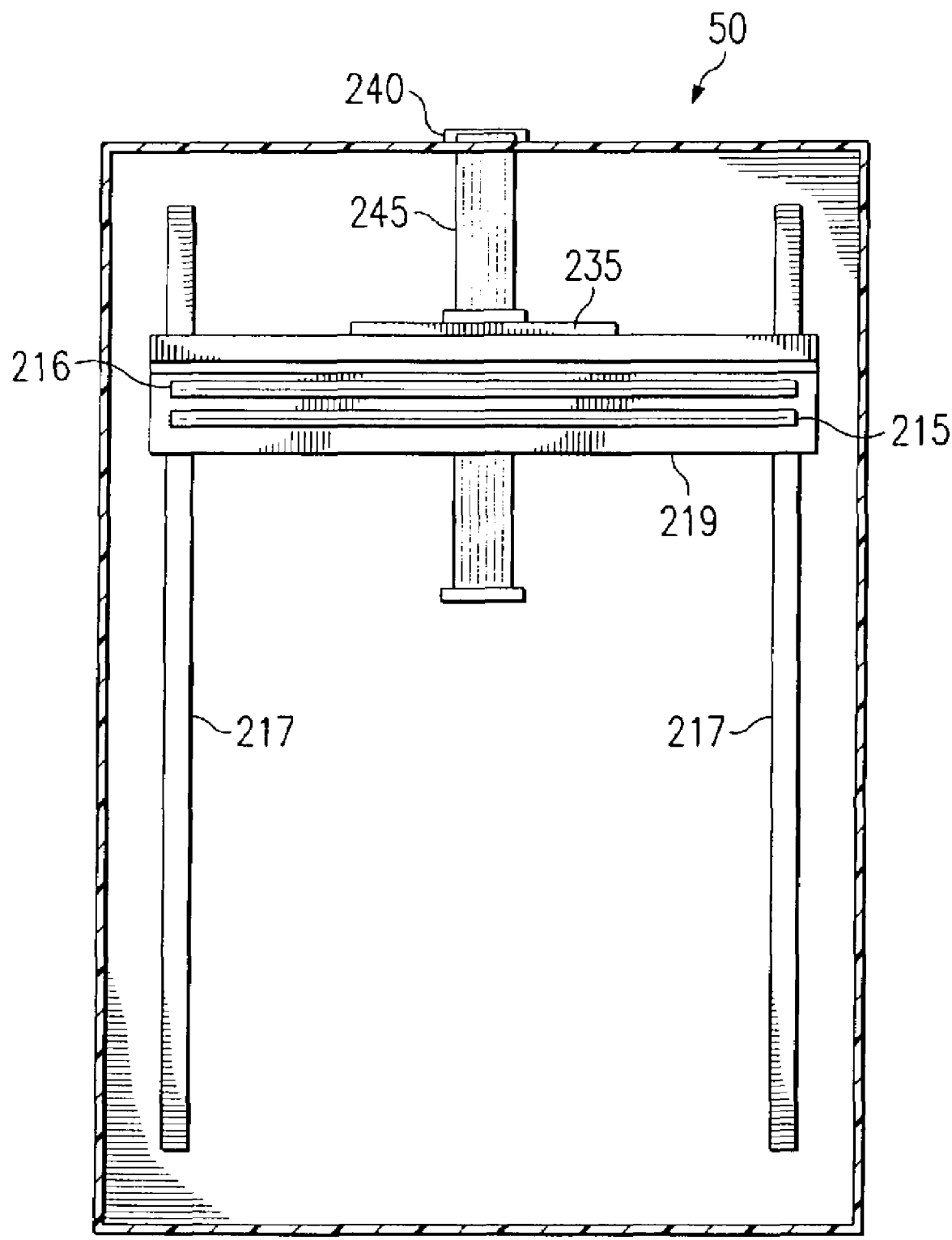
FIG. 4 is a top sectional schematic of an imaging apparatus as implemented according to an embodiment of the present invention.

FIG. 4 is a top sectional schematic of apparatus 50 as implemented according to an embodiment of the present invention. Carriage 219 has illumination devices 215 and 216 disposed laterally thereon and respectively operable to radiate visible and UV light; photosensitive device 221 is positioned in proximity therewith. Light reflected from a media object illuminated by lamp 215 and light radiated by a phosphor in reaction to irradiation by lamp 216 is incident on photosensitive device 221. Photosensitive device 221 converts the received light into electric signals and conveys the electric signals to scan controller 235 communicatively coupled with photosensitive device 221. Scan controller 235 is coupled with I/O interface 240 via communications cable 245 and I/O interface 240 may be coupled with computer 10 via a communication cable, e.g., a USB cable, a parallel cable, or another suitable communication medium, for transfer of image data thereto. A data set is preferably generated (by apparatus 50 or computer 80) from the electrical signals produced by photosensitive device 221. The data set defines the scanned image in a format suitable for computer processing, such as storage on a computer hard disk or other media, display on a computer monitor, and/or printing by a printer apparatus.

What is claimed is:

1. An imaging system, comprising:
   a carriage movable relative to an object disposed against a platen;
   an illumination device attached to the carriage and adapted to emit ultraviolet light toward the object; and
   a photosensitive device adapted to receive light reflected by the object for generating a scanned image of the object.

2. The system of claim 1, wherein the illumination device comprises a fluorescent black light tube.

3. The system of claim 1, further comprising another illumination device attached to the carriage and adapted to emit visible light toward the object.

4. An imaging apparatus, comprising:
   a platen for supporting an object;
   an illumination device operable to emit ultraviolet light toward the object; and
   a photosensitive device operable to receive fluoresced light emitted by the object and convert the received light into electrical signals comprising a scanned image of the object;
   and wherein the illumination device is disposed on a carnage of the imaging apparatus.

5. An imaging apparatus comprising:
a platen for supporting an object;
an illumination device operable to emit ultraviolet light toward the object; and
a photosensitive device operable to receive fluoresced light emitted by the object and convert the received light into electrical signals comprising a scanned image of the object; and
another illumination device operable to emit visible light toward the object.

* * * * *

UNITED STATES PATENT AND TRADEMARK OFFICE
CERTIFICATE OF CORRECTION

PATENT NO. : 7,148,493 B2  Page 1 of 1
APPLICATION NO. : 10/352299
DATED : December 12, 2006
INVENTOR(S) : Justin A. Tehrani It is certified that error appears in the above-identified patent and that said Letters Patent is hereby corrected as shown below:

In column 2, line 24, after "shown in" insert -- a --.

In column 2, line 28, after "shown in" insert -- a --.

In column 12, lines 29-30, delete "modified for" and insert -- embodiment of --, therefor.

In column 4, line 67, in Claim 4, delete "carnage" and insert -- carriage --, therefor.

In column 5, line 1, in Claim 5, after "apparatus" insert -- , --.

Signed and Sealed this

Fifth Day of May, 2009

JOHN DOLL
*Acting Director of the United States Patent and Trademark Office*